US009853829B2

(12) United States Patent
Lu

(10) Patent No.: US 9,853,829 B2
(45) Date of Patent: Dec. 26, 2017

(54) INTELLIGENT WIRELESS ROUTER AND WIRELESS COMMUNICATION SYSTEM

(71) Applicants: Yong Lu, Beijing (CN); Yingbiao Peng, Shanghai (CN)

(72) Inventor: Yong Lu, Beijing (CN)

(*) Notice: Subject to any disclaimer, the term of this patent is extended or adjusted under 35 U.S.C. 154(b) by 349 days.

(21) Appl. No.: 14/535,585

(22) Filed: Nov. 7, 2014

(65) Prior Publication Data

US 2015/0063169 A1    Mar. 5, 2015

Related U.S. Application Data

(63) Continuation of application No. PCT/CN2013/074788, filed on Apr. 26, 2013.

(30) Foreign Application Priority Data

May 11, 2012 (CN) .......................... 2012 1 0147774

(51) Int. Cl.
*G06F 15/177* (2006.01)
*H04L 12/28* (2006.01)
(Continued)

(52) U.S. Cl.
CPC ............ *H04L 12/282* (2013.01); *H04L 67/06* (2013.01); *H04W 76/04* (2013.01); *H04W 76/048* (2013.01); *H04L 2012/2841* (2013.01)

(58) Field of Classification Search
CPC .................. H04L 12/282; H04L 67/06; H04L 2012/2841; H04L 12/28; H04L 29/08; H04W 76/04
See application file for complete search history.

(56) References Cited

U.S. PATENT DOCUMENTS 7,313,384 B1* 12/2007 Meenan ................. H04L 63/08
                                                                455/410
2003/0100962 A1* 5/2003 Sumita ................ H04L 12/2803
                                                                700/65
(Continued)

FOREIGN PATENT DOCUMENTS

CN          101959024 A         1/2011
CN          102088382 A         6/2011
(Continued)

OTHER PUBLICATIONS

International Search Report, corresponding to PCT/CN2013/074788, dated Jul. 21, 2013, date of mailing Aug. 1, 2013.
(Continued)

*Primary Examiner* — Cheikh Ndiaye
(74) *Attorney, Agent, or Firm* — Renner, Otto, Boisselle & Sklar, LLP

(57) ABSTRACT

The disclosure provides an intelligent wireless router and a wireless communication system. The intelligent wireless router comprises a setting unit receiving initial setting information, connection setting information and device control information input from outside; a processing unit conducting initial setting on the intelligent wireless router according to the initial setting information, establishing or disconnecting wireless connection among a plurality of designated WIFI wireless terminals according to connection setting information, and controlling running states of the wireless terminals according to the device control information; a WIFI wireless communication unit establishing or disconnecting the wireless connection among the plurality of designated wireless terminals under the control of the processing unit, sending the device control information to the designated wireless terminals, and forwards a file among a (Continued)

plurality of wireless terminals; and a storage unit storing the setting information and the file to be forwarded.

12 Claims, 4 Drawing Sheets

(51) Int. Cl.
    *H04W 76/04*    (2009.01)
    *H04L 29/08*    (2006.01)

(56) References Cited

U.S. PATENT DOCUMENTS

| | | | |
|---|---|---|---|
| 2007/0197236 A1* | 8/2007 | Ahn | ................. H04L 12/2809 455/466 |
| 2011/0211584 A1 | 9/2011 | Mahmoud | |
| 2014/0254546 A1* | 9/2014 | L'Heureux | ........... H04W 12/06 370/331 |

FOREIGN PATENT DOCUMENTS

| | | |
|---|---|---|
| CN | 102238236 A | 11/2011 |
| CN | 102281251 A | 12/2011 |
| CN | 102651915 A | 8/2012 |
| CN | 202617361 U | 12/2012 |
| KR | 20020014185 A | 2/2002 |

OTHER PUBLICATIONS

The First Search Report Attached to the First Chinese Office Action.
The Supplement Search Report.
Search Report received in the corresponding Chinese Application No. 201210147774.8 dated Feb. 26, 2015 and the English translation.
4th Office Action received in the corresponding Chinese Application No. 201210147774.8 dated Mar. 6, 2015 and the English translation.

* cited by examiner

INTELLIGENT WIRELESS ROUTER AND WIRELESS COMMUNICATION SYSTEM

This application is a continuation of International Application No. PCT/CN2013/074788, filed on Apr. 26, 2013, which claims priority to Chinese Patent Application No. 201210147774.8, filed on May 11, 2012, both of which are hereby incorporated by reference in their entireties.

TECHNICAL FILED

The disclosure relates to a wireless communication apparatus for exchanging information files, dedicated to all kinds of devices, especially to an intelligent wireless router and wireless communication system.

BACKGROUND

With continuous application and development of network technology and computer technology, one-to-one file transfer including file information has been widely applied in daily work and life.

FIG. 1 is a diagram showing that two computers are directly connected through a data line to conduct file exchange in the prior art. As shown in FIG. 1, two computers 101, 103 are connected through the data line 102 shorter than or equal to 6 meters after setting, which forms a super terminal capable of conducting file exchange. Such mode can only be suitable for connection of two computers. When there are more than two users, it is not convenient to use.

FIG. 2 is a diagram showing that a mobile phone is connected with a TV set through a specific data cable to conduct frame video file transfer in the prior art. As shown in FIG. 2, the mobile phone 201 is connected with the TV set 203 through the specific data cable 202, so as to transfer a video file. Such operation way is only suitable for transferring a frame video file, but for such kind of operation, it only requires that the mobile phone 201 must have matched video interfaces.

FIG. 3 is a diagram showing that file is exchanged via a third-part network platform among the computer terminals in the prior art. As shown in FIG. 3, the computer terminals 301 and 303 conduct file exchange in mail via the third part or a WLAN network platform 302. This is a commonly used way recently. However, at a plurality of places such as home, office and exhibitions, such application mode will cause much inconvenience. For example, the data exchange using the network as a medium not only takes a risk of privacy leakage, but also may greatly increase the traffic of users, more possibly causing asynchronism, such that a controllable process cannot function immediately. Particularly for families, except for the computer, all kinds of household appliances are not organically connected together. Or, for daily design in a company focusing on design, continuous interaction, modification and supplementation of files are also necessary.

Therefore, there needs an apparatus for conveniently conducting file exchange among different terminal devices in a home network, an exhibition environment or an office scene.

SUMMARY

One object of some embodiments is to provide an intelligent wireless router, such that digital devices (such as the computer, the mobile phone and the TV set), on/off-type devices (an electric lamp and an electric cooker) and analog quantity devices for temperature adjustment (such as refrigerators, air conditioners and electric heaters) can have a measure of mutually transferring files and control instructions, thereby improving the application performance of the terminal to the maximum extent.

Another object of some embodiments is to provide a wireless communication system which enables the user to realize the control of a plurality of intelligent terminals within a coverage of a intelligent wireless router by means of a portable personal mobile device and the intelligent wireless router.

To achieve the above purpose, in one aspect, the embodiments of the embodiments provide an intelligent wireless router, including:

a setting unit for receiving setting information input from outside, the setting information including initial setting information, connection setting information and/or device control information;

a processing unit connected with the setting unit, for conducting initial setting on the intelligent wireless router according to the initial setting information, establishing or disconnecting wireless connection among a plurality of designated WIFI wireless terminals according to the connection setting information, and controlling the WIFI wireless terminals according to the device control information;

a WIFI wireless communication unit connected with the processing unit, for wirelessly receiving and sending files under the control of the processing unit; and a storage unit connected with the processing unit, for caching the file to be forwarded.

To achieve the above purposes, in one aspect, the embodiments of the present invention provides a wireless communication system, including an intelligent wireless router and a control device;

a setting unit for receiving setting information wirelessly transmitted by a control device, the setting information including initial setting information, connection setting information and device control information; the connection setting information including a wireless connection establishing instruction or a wireless connection disconnecting instruction as well as an identifier of the intelligent wireless terminal designated to establish or disconnect connection;

a processing unit connected with the setting unit, for conducting initial setting on the intelligent wireless router according to the initial setting information, establishing or disconnecting the wireless connections among a plurality of designated intelligent wireless terminals according to the connection setting information, and controlling running states of the WIFI wireless terminals according to the device control information;

a WIFI wireless communication unit connected with the processing unit, for establishing or disconnecting the wireless connection among the plurality of designated WIFI wireless terminals under the control of the processing unit, sending the device control information to the designated WIFI wireless terminal, and forwarding a file among a plurality of WIFI wireless terminals;

a storage unit connected with the processing unit, for storing the setting information and caching the forwarded file; and a control device, for presenting indication items of the plurality of intelligent wireless terminals at its touch screen; generating, in response to a connecting operation or a releasing connection operation conducted by the user on the indication items of at least two intelligent wireless terminals through the touch screen, the wireless connection establishing instruction or wireless connection disconnecting instruction corresponding to the at least two intelligent wireless terminals; and sending the wireless connection establishing instruction or wireless connection disconnecting instruction, and identifiers of the at least two intelligent wireless terminals to the intelligent wireless router; wherein the intelligent wireless terminal comprises a WIFI wireless terminal.

BRIEF DESCRIPTION OF THE DRAWINGS

In order to more clearly describe the embodiments of the present invention or the technical solutions of the prior art, the drawings to be used in the descriptions of the embodiments or the prior art are briefly introduced as follows. Obviously, the following drawings just illustrate some embodiments of the present invention, and a person skilled in the art can also obtain other drawings from these drawings without paying any creative effort.

DETAILED DESCRIPTION OF THE EMBODIMENTS

The technical solutions in the embodiments of the present invention will be clearly and completely described below in combination with the drawings in the embodiments of the present invention. Obviously, those described herein are just some of the embodiments of the present invention rather than all the embodiments. Based on the embodiments of the present invention, any other embodiment obtained by a person skilled in the art without paying any creative effort shall fall within the protection scope of the present invention.

Figure 1:
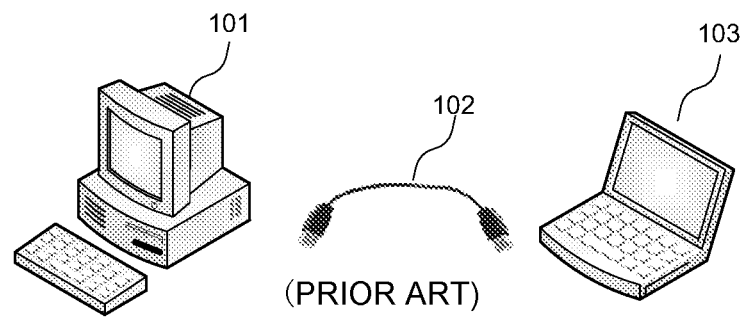
FIG. 1 is a diagram showing that two computers are directly connected through a data line to conduct file exchange in prior art.
Figure 2:
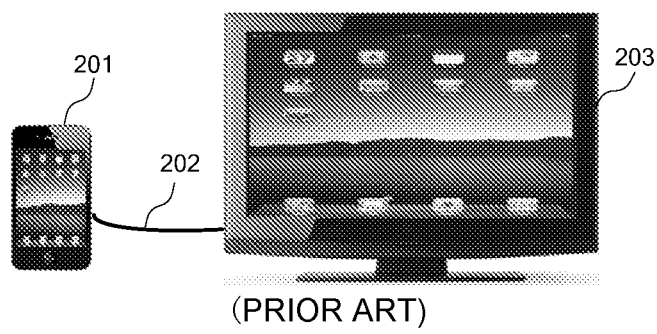
FIG. 2 is a diagram showing that a mobile phone is connected with a TV set through a specific data cable to conduct frame video file transfer in the prior art.
Figure 3:
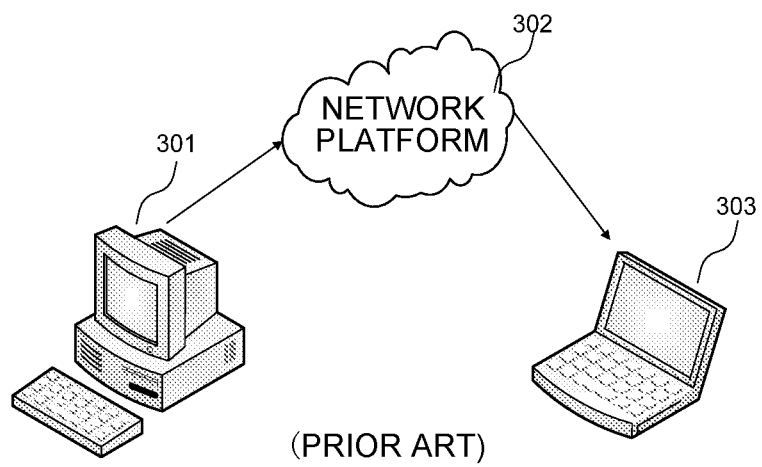
FIG. 3 is a diagram showing that the file exchange is conducted via a third-part network platform among the computer terminals in the prior art.
Figure 4:
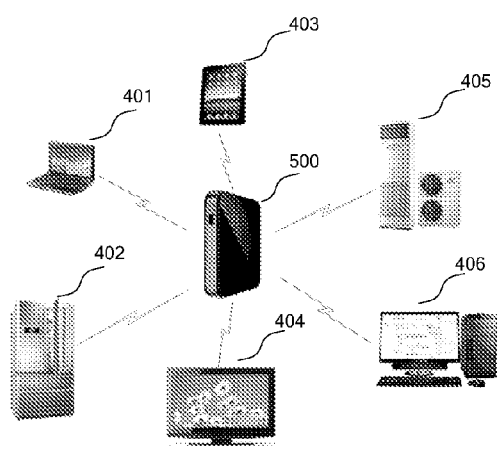
FIG. 4 is a diagram showing interconnection of the intelligent wireless router according to the embodiments of the present invention with various different terminal devices.

FIG. 4 is a diagram showing interconnection of the intelligent wireless router according to the embodiments of the present invention with various different terminal devices. As shown in FIG. 4, the intelligent wireless router performs file exchange among various terminals in a near field wireless communication mode such as WIFI, Bluetooth technology or ZigBee. Such terminal devices include a notebook computer 401, a refrigerator 402, a tablet computer 403, a digital TV set 404, an air conditioner 405 and a desktop computer 406. These terminal devices are correspondingly configured with wireless communication modules. Such file exchange manner can be a group sending mode for the same file, or a controllable sending mode. The group sending mode means that a file of the notebook computer 401 is sent to a plurality of designed digital devices at the same time by means of the intelligent wireless router 500, which is mostly applied in an environment such as an office. However, the controllable sending mode is to individually send the file by means of the intelligent wireless router 500 according to a visually connection situation, for example, the notebook computer 401 only sends the file to the digital TV set 404 and so on. The intelligent wireless router 500 has a relatively large storage space, a plurality of WIFI channels and internal application programs.

Figure 5:
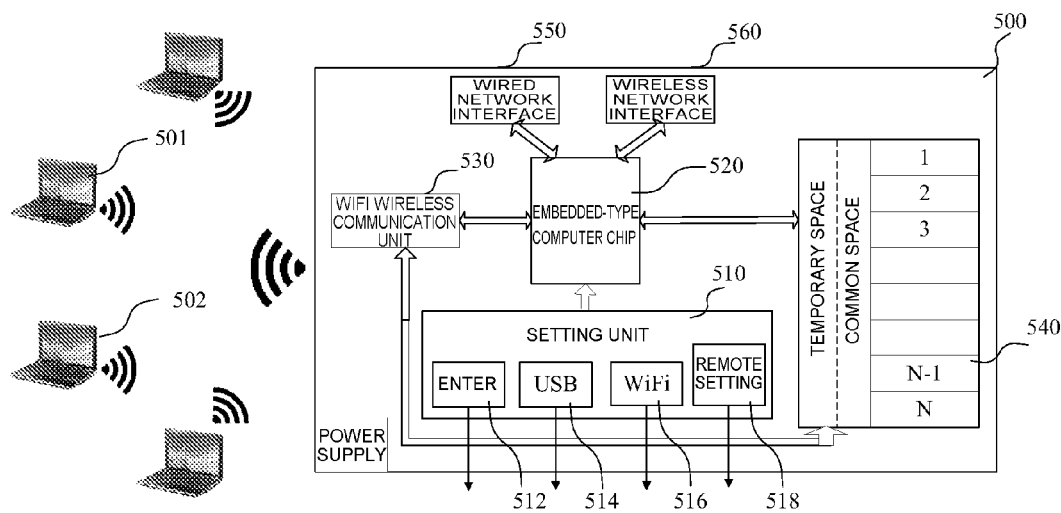
FIG. 5 is a function structural block diagram of the intelligent wireless router according to the embodiments of the present invention.

FIG. 5 is a function structural block diagram of the intelligent wireless router according to the embodiments of the present invention. As shown in FIG. 5, the intelligent wireless router 500 includes:

a setting unit 510 for receiving setting information input from outside, the setting information including initial setting information, connection setting information and device control information;

a processing unit 520 connected with the setting unit, for conducting initial setting on the wireless communication apparatus according to the initial setting information, establishing or disconnecting the wireless connections among a plurality of designated WIFI wireless terminals according to the connection setting information, and controlling running states of the WIFI wireless terminals according to the device control information; the processing unit 520 may be an embedded-type computer chip;

a WIFI wireless communication unit 530 connected with the processing unit 520, for establishing or disconnecting the wireless connections among the plurality of designated WIFI wireless terminals under the control of the processing unit 520, sending the device control information to the designated WIFI wireless terminals, and forwarding a file among a plurality of WIFI wireless terminals; and a storage unit 540 connected with the processing unit 520, for storing the setting information and caching the forwarded file.

Optionally, the setting unit 510 may include an entering-type setting module 512, for entering the setting information through physical keys.

Optionally, the setting unit 510 may further include a USB connection setting module 514 for receiving the setting information input from outside through a USB interface; or a near field wireless setting module 516 for receiving the setting information input from outside through WIFI, Bluetooth or ZigBee. Optionally, the setting unit 510 may further include a remote setting module 518 for remotely inputting the setting information through a wired and/or wireless network.

Optionally, the intelligent wireless router 500 further includes a wired network interface 550 and/or wireless network interface 560 connected with the processing unit 520, for connecting the intelligent wireless router 500 with the Internet through the wired network interface 550 and/or wireless network interface 560. In addition, through the wired network interface 550 and/or wireless network interface 560, each of the other WIFI wireless terminals (such as 501 and 502) connected with the intelligent wireless router 500 can access the Internet. As an optional application, a mobile wireless network card can be connected with the wireless network interface 560, so as to connect the intelligent wireless router 500 and other connected WIFI wireless terminals to the Internet.

The WIFI wireless terminals 501 and 502 each is a device configured with the WIFI wireless communication apparatus, belonging to the intelligent wireless terminal, the device including one or more of the following: computer, mobile communication terminal, TV set, electric lamp, electric cooker, refrigerator, air condition, electric heater, video camera, photo camera and gas appliance.

Specifically, the device control information includes on/off-type control instructions corresponding to on/off-type devices including an electric lamp and an electric cooker; digital control instructions corresponding to digital devices including the computer, the mobile communication terminal and the TV set; and analog quantity control instructions corresponding to analog devices including refrigerators, air conditioners and electric heaters.

Specifically, the processing unit 520 can be used for setting a password, time, date and registered intelligent terminal devices of the intelligent wireless router 500 according to the initial setting information.

Specifically, the setting unit 510 can be used for receiving connection setting instructions wirelessly input by the mobile communication terminal, the connection setting instruction including identifiers of one or more WIFI wireless terminals requiring to establish connection or disconnect connection as well as wireless connection establishing instructions or wireless connection disconnecting instructions.

Specifically, the intelligent wireless router 500 further includes a power supply unit for supplying power to each unit.

Specifically, the storage space inside the storage unit 540 includes a temporary space, a common storage space and respectively reserved storage space for each intelligent terminal, wherein 1-N in FIG. 5 respectively represent N sections of storage spaces reserved for N intelligent wireless terminals. The temporary space is used for temporarily storing excessive incoming data, which will result in being too late to conduct exchange by the intelligent wireless router, when this intelligent wireless router is connected to a high-speed data device. The common space is used for storing the files distributed to a plurality of intelligent wireless terminals, the files possibly being the files to be frequently exchanged in a company office, or public notice/notification, or publicity materials and meeting records to be distributed to all attendant participants in the exhibition. The files in the common space can be sent in the group sending mode.

In the present embodiments, one "key" is designed for each intelligent wireless terminal, which keeps the terminal and the terminal data secrete and identifies the same, as well as prevents the device from being invoked by its adjacent apparatus.

Optionally, the WIFI wireless communication unit 530 can also be connected with the storage unit 540, for directly interacting the storage unit 540 so as to storing and retrieving data, instead of relaying data by the processing unit 520 when there is relatively large data traffic in order to reduce the burden of the processing unit 520.

In one embodiment, after the wireless connection is established among a plurality of WIFI wireless terminals, the plurality of WIFI wireless terminals conduct the file exchange based on the group sending mode.

In one embodiment, the setting unit 510 is set wirelessly by using the mobile phone to download a software specific to the intelligent wireless router, and then connecting with the intelligent wireless router using the near field wireless communication means such as WIFI, Bluetooth, ZigBee or the like.

Figure 6:
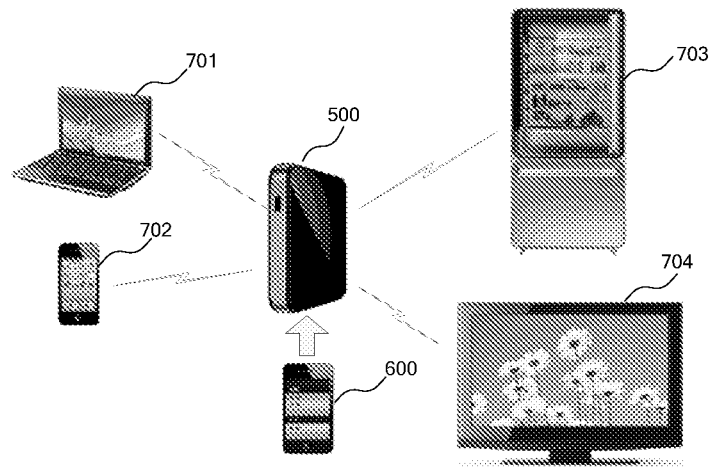
FIG. 6 is a connection diagram showing that the intelligent wireless router according to the embodiments of the present invention is applied to a home network.

The embodiment of the present invention further provides a wireless communication system. With reference to FIGS. 5-6, FIG. 6 shows an example that the intelligent wireless router according to the embodiment of the present invention is applied to a home network. In FIG. 6, the intelligent wireless router 500 can establish, as needed, wireless connection or disconnect the wireless connection with a computer 701, a personal mobile communication terminal 702, a refrigerator 703 of the household appliances and a TV set 704 in the household appliances commonly used at home. Each kind of the above electric appliances is designed with a corresponding wireless conversion reception apparatus. The wireless communication system includes the intelligent wireless router 500 and the control device 600.

The intelligent wireless router 500 includes:

a setting unit 510 for receiving setting information wirelessly transmitted by a control device 600, the setting information including initial setting information, connection setting information and device control information; the connection setting information including a wireless connection establishing instruction or a wireless connection disconnecting instruction as well as an identifier of the intelligent wireless terminal designated to establish or disconnect connections;

a processing unit 520 connected with the setting unit 510, for conducting initial setting on the intelligent wireless router according to the initial setting information, establishing or disconnecting the wireless connections among a plurality of designated intelligent wireless terminals according to the connection setting information, and controlling running states of the WIFI wireless terminals according to the device control information;

a WIFI wireless communication unit 530 connected with the processing unit 520, for establishing or disconnecting the wireless connection among the plurality of designated WIFI wireless terminals under the control of the processing unit 520, sending the device control information to the designated WIFI wireless terminal, and forwarding a file among a plurality of WIFI wireless terminals;

a storage unit 540 connected with the processing unit, for storing the setting information and caching the forwarded file; and a control device 600, for presenting indication items of the plurality of intelligent wireless terminals at its touch screen; generating, in response to a connecting operation or a releasing connection operation conducted by the user on the indication items of the at least two intelligent wireless terminals through the touch screen, the wireless connection establishing instructions or wireless connection disconnecting instructions corresponding to the at least two intelligent wireless terminals; and sending the identifiers of the at least two intelligent wireless terminals and the wireless connection establishing instructions or wireless connection disconnecting instructions to the intelligent wireless router 500; wherein the intelligent wireless terminal includes a WIFI wireless terminal. These indication items can be entries or images. The control device is the mobile communication terminal, tablet computer, pocket computer or other wireless mobile devices.

Optionally, the control device 600 can further generate, in response to a connecting operation or a releasing connection operation conducted by the user on the indication item of the control device 600 itself and the indication item of other intelligent wireless terminal through the touch screen, the corresponding connection setting information and send to the intelligent wireless router 500 which establishes or disconnects the wireless connection between the control device 600 and the designated other intelligent wireless terminals.

Optionally, when the control device adopts the mobile communication terminal, it is possible to embed the mobile communication terminal into this apparatus, for use operation. It is also possible to connect the mobile communication terminal 600 for connection control with the intelligent wireless router 500 by a standard USB interface cable, for use operation; likewise, it is also possible to connect the mobile communication terminal 600 for connection control with the intelligent wireless router 500 by the wireless communication mode, and it is acceptable to connect the mobile communication terminal 600 for connection control with the intelligent wireless router 500 by using a wired network, for use operation.

Figure 7:
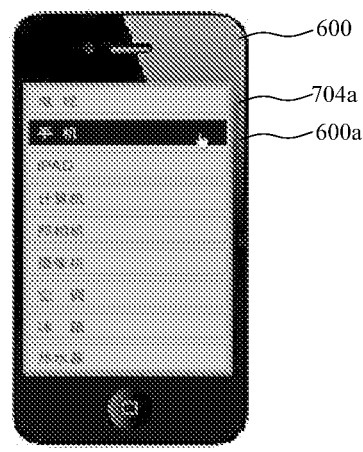
FIG. 7 is an operation interface diagram of the mobile communication terminal 600 in FIG. 6 according to the embodiments of the present invention.

FIG. 7 is an operation interface diagram of the mobile communication terminal 600 as the control device in FIG. 6 according to the embodiments of the present invention. As shown in FIG. 7, assuming that the user needs to connect a mobile phone 600 with the TV set 704, the operation process is as follows: the mobile phone 600 is entered into the setting program state so that the mobile phone 600 at this time is configured as the control device, the user presses an entry 600a of the mobile phone 600 with hands through the touch screen of the mobile phone 600, and slides to the connected target device (that is, the entry 704a corresponding to the TV set 704), and then loose, thereby forming an effective connection between the TV set 704 and the mobile phone 600. Then, it is OK to make the mobile phone exit the setting program state, so that the mobile phone 600 at this time is configured as a common mobile phone without the control function. The respective video file on the mobile phone 600 may be transmitted to the TV set 704 via the intelligent wireless router 500, so as to be displayed. That is, the mobile phone can switch between a control state and a common state. During the connection is released, a mark of the entry may be clicked and then the connection relationship is displayed. Once the user presses one connection entry and slides away from it, the connection is released.

Figure 8:
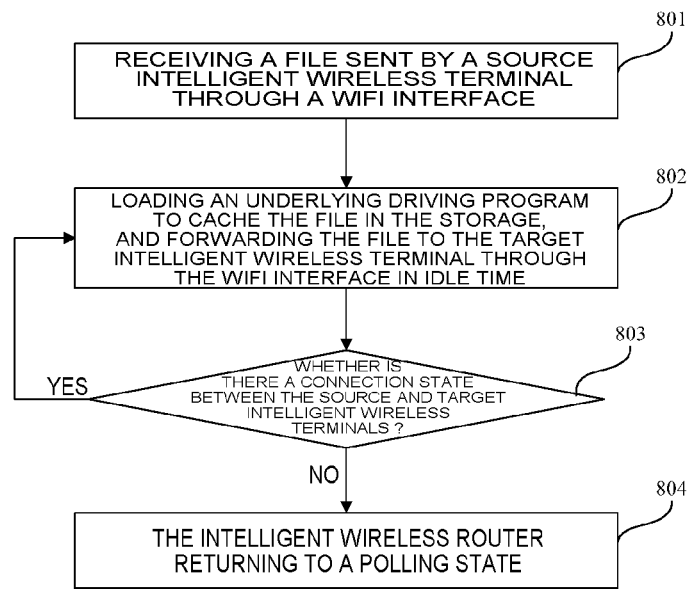
FIG. 8 is an operation process diagram of the intelligent wireless router according to the embodiments of the present invention.

FIG. 8 is an operation process diagram of the intelligent wireless router according to the embodiments of the present invention. With reference to FIGS. 5 and 8, the operation process of the intelligent wireless router includes the following steps:

step 801: receiving a file sent by a source intelligent wireless terminal (for example, 501) through a WIFI interface (WIFI wireless communication unit 530);

step 802: loading an underlying driving program to cache the file in the storage, and forwarding the file to the target intelligent wireless terminal (for example, 502) through the WIFI interface in idle time;

step 803: judging whether there is a connection state between the source intelligent wireless terminal and the target intelligent wireless terminal, and if yes, returning to the step 802, otherwise, proceeding to the step 804;

step 804: the intelligent wireless router returning to a polling state.

Optionally, when the intelligent wireless terminal forwards the file, the corresponding prompt information is presented or the file transmission process is displayed on the mobile communication terminal for controlling the intelligent wireless router.

Figure 9:
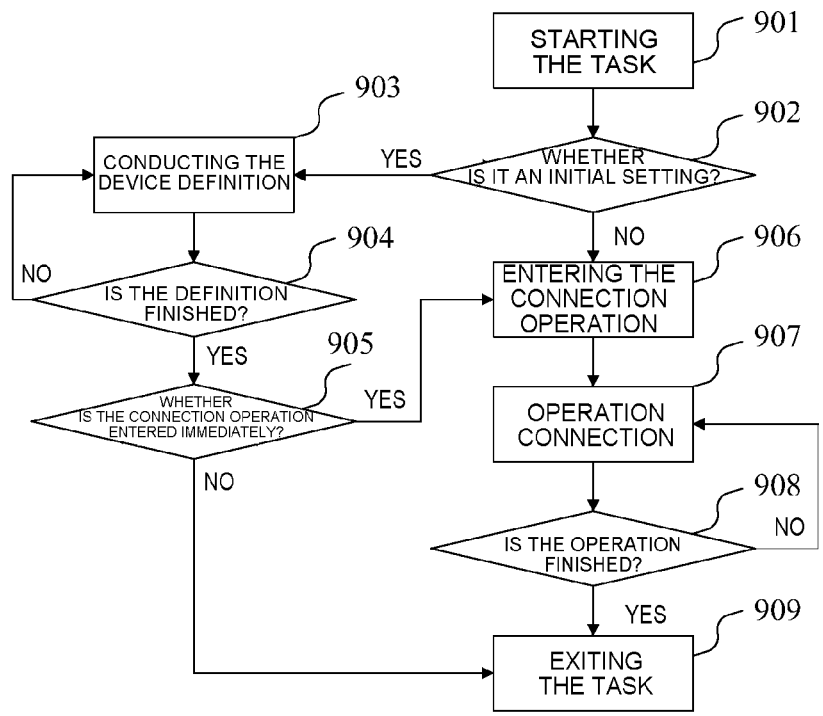
FIG. 9 is a flow chart of an operation method of the wireless communication system according to the embodiments of the present invention.

FIG. 9 is a flow chart of an operation method of the wireless communication system according to the embodiments of the present invention. As shown in FIG. 9, the method includes the following steps:

step 901: starting the task;

step 902: judging, by the intelligent wireless router, whether it is an initial setting, and if yes, proceeding to the step 903, if not, proceeding to the step 905; the step is to judge whether the intelligent wireless router is new, if yes, it needs to enter various device definitions. It is to be particularly pointed out that the network is one of the devices to be defined. The Internet is defined as a device. In this way, it is possible to establish the connection between various intelligent terminal devices and the Internet, which can implement the function of surfing the Internet by various intelligent terminal devices.

step 903: conducting, by the intelligent wireless router, the device definition; in this step, the initial setting or definition for various devices is conducted. It includes some elements such as the number, password and management level of the device. It shall be stated clearly that such devices include digital devices (such as the computer, the mobile phone and the TV set), on/off-type devices (such as an electric lamp and an electric cooker) and analog quantity devices for temperature adjustment (such as refrigerators, air conditioners and electric heaters), while such devices are different in term of control. For example, the digital device and instructions are embodied in the digital mode; the on/off-type device is embodied in switchable two state modes; while the analog quantity device is embodied in the controllable multi-state mode, such as the temperature: if the unit is 1° C., and 4° C. shall be 4 when 0° C. is set to be 0;

step 904: judging, by the intelligent wireless router, whether the device definition is finished, and if not, returning to the step 903 for continuous device definition, if yes, proceeding to the step 905;

wherein the steps 903 and 904 form a repeated operation specification, such that various devices are defined sufficiently, or the definition is changed based on the existing definition;

step 905: judging whether the connection operation is entered immediately, and if yes, proceeding to the step 906, if not, proceeding to the step 909;

step 906: entering the connection operation;

step 907: conducting operation on the mobile communication terminal to connect the corresponding device; the specific operation process is to press and slide the indication item (entry or image) of a selected device to a target device column in the menu/list of the devices presented on the display unit of the mobile communication terminal, in order to finish the connection of the two devices. Similarly, it is possible to connect the third device thereto, and so on. On the other hand, releasing the connection is to click each device column to check whether more than two devices are displayed, and to separate away the devices unnecessary to be connected.

step 908: judging whether the operation is finished, and if yes, entering the step 909, if not, returning to the step 907;

step 909: exiting the task.

For families, the intelligent wireless router can achieve the purpose of conveniently exchanging data files among various kinds of household appliances, establishing the contacts among various household appliances, sending corresponding control instructions to various kinds of household appliances, and conveniently realizing various control operations. For example, it is possible to set the switch operation of the on/off-type appliance, to set the process setting of the analog quantity appliance (such as the temperature setting of the refrigerator and the water heater and so on), and to give the corresponding digital instructions to the controlled computer in order to control the start/stop of the corresponding application program on the computer.

The above technical solutions provided by the embodiments of the present invention have the advantageous technical effects that for family, it is possible to conveniently exchange data files among various household appliances and send corresponding control instructions to various household appliances through the intelligent wireless terminal. In addition, the wireless connection situations among any plural wireless WIFI terminals in the wireless local area network at home or office may be conveniently controlled through the portable mobile device.

The above embodiments are only used for explaining the technical solutions of the embodiments of the present invention, instead of limiting the same; although the embodiments of the present invention are described in detail above with reference to the foregoing embodiments, persons skilled in the art should understand that it is still possible to amend the technical solutions stated in each foregoing embodiment, or equivalently replace part of the technical features; while such amendments or replacements do not make the corresponding technical solutions essentially depart from the spirit and scope of the technical solutions of each embodiment of the present invention.

What is claimed is:

1. An intelligent wireless router, comprising:
    a setting unit for receiving setting information input from a control device external to the intelligent wireless router, the setting information comprising initial setting information, connection setting information and device control information;
    a processing unit connected with the setting unit, for conducting initial setting on the intelligent wireless router according to the initial setting information, establishing or disconnecting WIFI connections among a plurality of designated WIFI wireless terminals according to the connection setting information, and controlling running states of the WIFI wireless terminals according to the device control information;
    a WIFI wireless communication unit connected with the processing unit, for establishing or disconnecting the WIFI connections among the plurality of designated WIFI wireless terminals under the control of the processing unit, sending the device control information to the designated WIFI wireless terminals, and forwarding a file among a plurality of WIFI wireless terminals; and
    a storage unit connected with the processing unit, for storing the setting information and caching the file to be forwarded,
    wherein the device control information comprises:
        on/off-type control instruction corresponding to on/off-type device comprising an electric lamp and an electric cooker;
        digital control instruction corresponding to digital device including computer, mobile communication terminal and TV set; and
        analog quantity control instruction corresponding to analog device including refrigerator, air conditioner and electric heater.

2. The intelligent wireless router according to claim 1, wherein the setting unit comprises an entering type setting module for entering the setting information through physical keys.

3. The intelligent wireless router according to claim 1, wherein the setting unit comprises:
    a USB connection setting module for receiving the setting information input from the control device external to the intelligent wireless router through a USB interface; or
    a near field wireless setting module for receiving the setting information input from the control device external to the intelligent wireless router through WIFI, Bluetooth or ZigBee; or
    a remote setting module for remotely receiving the setting information input from the control device external to the intelligent wireless router through a wired and/or wireless network.

4. The intelligent wireless router according to claim 1, further comprising a wired and/or wireless network interface, connected with the processing unit, for connecting the intelligent wireless router or the WIFI wireless terminal with the Interface through the wired and/or wireless network interface.

5. The intelligent wireless router according to claim 1, wherein the WIFI wireless terminal is a device configured with a WIFI wireless communication apparatus, the device comprising any one or more of the following: computer, mobile communication terminal, TV set, electric lamp, electric cooker, refrigerator, air conditioner, electric heater, video camera, photo camera and gas appliance.

6. The intelligent wireless router according to claim 1, wherein the processing unit is specifically used for setting a password, time, date and registered intelligent terminal devices of the intelligent wireless router according to the initial setting information.

7. The intelligent wireless router according to claim 5, wherein the processing unit is specifically used for setting a password, time, date and registered intelligent terminal devices of the intelligent wireless router according to the initial setting information.

8. The intelligent wireless router according to claim 1, wherein the setting unit is specifically used for receiving connection setting instruction wirelessly input by the mobile communication terminal, the connection setting instruction comprising identifiers of the WIFI wireless terminal requiring to establish connection or disconnect connection as well as WIFI connection establishing instructions or WIFI connection disconnecting instructions.

9. The intelligent wireless router according to claim 3, wherein the setting unit is specifically used for receiving connection setting instruction wirelessly input by the mobile communication terminal, the connection setting instruction comprising the identifiers of the WIFI wireless terminal requiring to establish connection or disconnect connection as well as WIFI connection establishing instructions or WIFI connection disconnecting instructions.

10. The intelligent wireless router according to claim 1, wherein the plurality of WIFI wireless terminals conduct file exchange based on a group sending mode, after the WIFI connections are established among the plurality of WIFI wireless terminals.

11. A wireless communication system, comprising an intelligent wireless router and a control device;
    the intelligent wireless router comprising:
        a setting unit for receiving setting information wirelessly transmitted by the control device, the setting information comprising initial setting information, connection setting information and device control information; the connection setting information comprising a WIFI connection establishing instruction or a WIFI connection disconnecting instruction as well as an identifier of the intelligent wireless terminal designated to establish or disconnect connections;

a processing unit connected with the setting unit, for conducting initial setting on the intelligent wireless router according to the initial setting information, establishing or disconnecting WIFI connections among a plurality of designated intelligent wireless terminals according to the connection setting information, and controlling running states of the WIFI wireless terminals according to the device control information;

a WIFI wireless communication unit connected with the processing unit, for establishing or disconnecting the WIFI connections among the plurality of designated WIFI wireless terminals under the control of the processing unit, sending the device control information to the designated WIFI wireless terminals, and forwarding a file among a plurality of WIFI wireless terminals; and a storage unit connected with the processing unit, for storing the setting information and caching the file to be forwarded, the control device, for presenting indication items of a plurality of intelligent wireless terminals at its touch screen; generating, in response to a connecting operation or a releasing connection operation conducted by a user on the indication items of the at least two intelligent wireless terminals through the touch screen, the WIFI connection establishing instructions or the WIFI connection disconnecting instructions corresponding to the at least two intelligent wireless terminals; and sending the WIFI connection establishing instructions or the WIFI connection disconnecting instructions, and the identifiers of the at least two intelligent wireless terminals to the intelligent wireless router; wherein the intelligent wireless terminal comprises a WIFI wireless terminal, wherein the device control information comprises:
 on/off-type control instruction corresponding to on/off-type device comprising an electric lamp and an electric cooker;
 digital control instruction corresponding to digital device including computer, mobile communication terminal and TV set; and
 analog quantity control instruction corresponding to analog device including refrigerator, air conditioner and electric heater.

12. The wireless communication system according to claim 11, wherein the control device is a mobile communication terminal, a tablet computer, a pocket computer or other wireless mobile device.

* * * * *